UNITED STATES PATENT OFFICE.

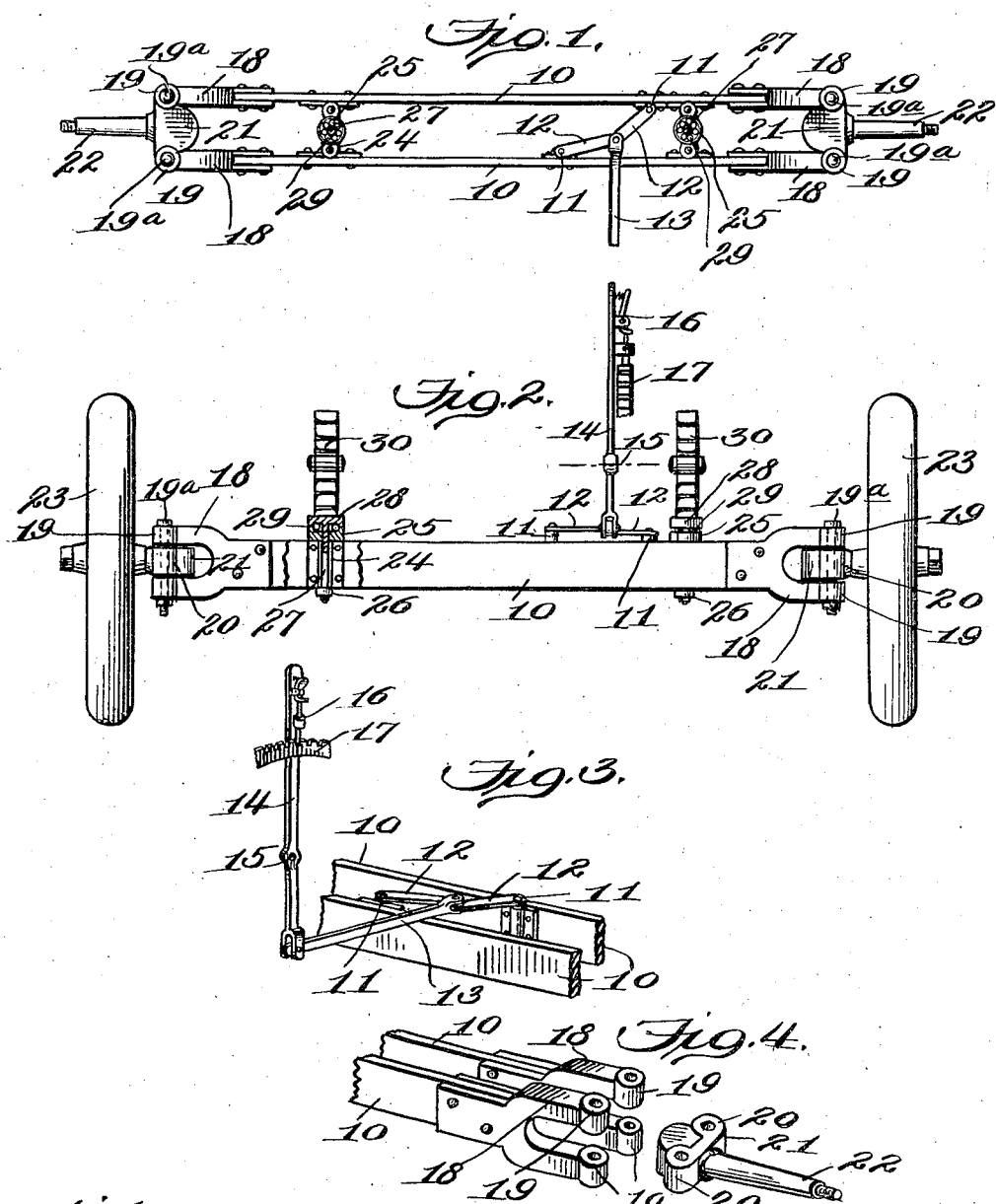

JOHN H. YOUNG, OF HASKELL, OKLAHOMA.

STEERING MECHANISM.

968,627.  Specification of Letters Patent.  Patented Aug. 30, 1910.

Application filed March 14, 1910. Serial No. 549,096.

*To all whom it may concern:*

Be it known that I, JOHN H. YOUNG, a citizen of the United States, residing at Haskell, in the county of Muskogee and State of Oklahoma, have invented certain new and useful Improvements in Steering Mechanism, of which the following is a specification.

My present invention relates to steering devices especially adapted to that character of motor vehicles embodying a rear wheel drive, the object of my invention being to provide a novel front axle and front wheel connections together with simple and efficient means to operate the same in such manner as to cause said wheels to be moved in a desired direction.

With this in view my invention specifically resides in the features of construction, arrangement and operation to be hereinafter described with reference to the accompanying drawing, in which, Figure 1 is a plan view thereof. Fig. 2 is a front elevation. Fig. 3 is a detail perspective view of the steering lever and its connections, and, Fig. 4 is a similar view of the connected portions of the axle bars and stub shaft, broken away.

Referring to these figures, I provide a front axle for motor vehicles which comprises juxtaposed parallel axle-bars 10 which have upstanding, intermediate and non-alined posts 11 upon which are journaled the outer ends of short links 12, the latter being pivotally connected at their inner ends to the forward end of a rod 13, to form a toggle adapted to cause longitudinal movement of said axle-bars 10 in relatively opposite directions upon reciprocatory movement of said rod 13. The rod 13 may be reciprocated in any suitable manner, for instance by the vertical steering lever 14, intermediately fulcrumed at 15 and having its lower end pivoted to the rear end of said rod, and its upper end provided with a latch mechanism 16 in engagement with a notched quadrant 17.

The axle-bars 10 have, at their end, outwardly-projecting, vertically arranged U-shaped castings or members 18 having vertically alined tubular portions 19 which are connected by pins 19ª to tubular portions 20 at opposite ends of castings or members 21 transversely connecting the adjacent ends of said axle-bars, and to the center of which castings or members 21 are connected the inner ends of the stub-shafts 22 on which the front wheels 23 are journaled. Thus when axle-bars 10 are moved in relatively opposite directions, the stub-shafts 22, and wheels 23 are correspondingly moved to angle positions to affect the course of the vehicle as desired.

Adjacent their outer ends, the axle bars 10 have vertical tubular members 24 upon their inner faces, to be connected by vertical pivot pins to upper and lower plates 25 and 26 respectively, these plates being centrally apertured to receive posts 27 depending from blocks 28 which rest upon balls 29 disposed in circular races in the upper faces of the upper plates 25 about their said central apertures. In this manner, the blocks 28 are well adapted to support body springs 30.

I claim:

1. The combination of a pair of juxtaposed longitudinal bars forming an axle, stub wheel shafts having connections at opposite sides thereof to the respective ends of said axle-bars, means to move said bars longitudinally in relatively opposite directions, and spring supporting members extending between, and hinged to, said axle bars.

2. The combination of a pair of juxtaposed longitudinal bars forming an axle, a toggle to move said bars longitudinally in relatively opposite directions, means to actuate said toggle, stub wheel shafts at the ends of said bars, and connections between said shafts and said ends of said bars whereby to swing the former in relatively opposite directions when the latter are so moved.

In testimony whereof I affix my signature in presence of two witnesses.

JOHN H. YOUNG.

Witnesses:
J. E. WOLCOTT,
J. B. CARNEY.